(12) United States Patent
Fu et al.

(10) Patent No.: US 7,914,834 B2
(45) Date of Patent: Mar. 29, 2011

(54) METHOD OF FORMING FOOD PRODUCT

(75) Inventors: Bin Fu, Battle Creek, MI (US); Don Barnes, Augusta, MI (US); Suzanne Annette Devyak, Battle Creek, MI (US)

(73) Assignee: Kellogg Company, Battle Creek, MI (US)

( * ) Notice: Subject to any disclaimer, the term of this patent is extended or adjusted under 35 U.S.C. 154(b) by 1057 days.

(21) Appl. No.: 11/453,510

(22) Filed: Jun. 15, 2006

(65) Prior Publication Data
US 2006/0286244 A1 Dec. 21, 2006

Related U.S. Application Data

(60) Provisional application No. 60/690,757, filed on Jun. 15, 2005.

(51) Int. Cl.
A23P 1/10 (2006.01)
(52) U.S. Cl. ......... 426/503; 426/512; 426/518; 425/299
(58) Field of Classification Search .................. 426/496, 426/499, 502, 503, 512, 514, 517, 518; D1/122–124, D1/128; 101/3.1–32; 425/298–300
See application file for complete search history.

(56) References Cited

U.S. PATENT DOCUMENTS

| | | | |
|---|---|---|---|
| 177,319 A * | 5/1876 | Blaul | 425/471 |
| 550,337 A | 11/1895 | Wolff et al. | |
| 819,772 A | 5/1906 | Latham | |
| D67,885 S * | 7/1925 | Gansle | D1/122 |
| 1,803,588 A | 5/1931 | Blank et al. | |
| 1,874,511 A * | 8/1932 | Habermaas | 425/299 |
| 1,882,160 A | 10/1932 | Paris | |
| 1,945,755 A | 2/1934 | Scruggs | |
| 2,075,157 A | 3/1937 | Alberti | |
| 2,081,724 A * | 5/1937 | Abbott | 425/194 |
| 2,106,009 A | 1/1938 | Lee | |
| 2,116,930 A | 5/1938 | Kirchhoff | |
| D120,037 S * | 4/1940 | Werner | D1/128 |
| 2,197,784 A | 4/1940 | Bauer et al. | |
| 2,346,242 A * | 4/1944 | Turner | 30/359 |
| 2,405,661 A * | 8/1946 | MacManus | 426/499 |
| D146,074 S * | 12/1946 | Carr | D1/115 |
| 2,483,173 A | 9/1949 | Behnke | |
| 2,589,908 A * | 3/1952 | Weidenmiller | 425/299 |
| 2,615,810 A | 10/1952 | Stone et al. | |
| 2,618,852 A * | 11/1952 | Clough | 30/299 |

(Continued)

OTHER PUBLICATIONS

Haust Hors d'Oeuvre Crackers—Snack Cups; Sea-Cups; Mar. 12, 2001; 3 pgs.; www.productscan.com/imageslo/mar2001/p05-059-2001.jpg.

*Primary Examiner* — Drew E Becker
(74) *Attorney, Agent, or Firm* — Dickinson Wright PLLC

(57) ABSTRACT

The invention provides a method of forming an edible item. The method includes the step of forming dough into a substantially planar ribbon having a first height. The dough is at least partially elastic. The method also includes the step of permanently displacing a portion of the at least partially elastic ribbon to a second height greater than the first height with a cutting die. The inventive method can produce a cracker formed from sheetable dough. The inventive cracker includes a first portion of planar configuration and a second portion integrally formed with and raised from said first portion.

12 Claims, 5 Drawing Sheets

U.S. PATENT DOCUMENTS

| | | | |
|---|---|---|---|
| 2,665,215 A | | 1/1954 | Gray et al. |
| 2,713,833 A | * | 7/1955 | Fay .................. 425/385 |
| 2,783,719 A | | 3/1957 | Rhodes |
| 3,049,426 A | | 8/1962 | Dorsey et al. |
| 3,302,592 A | * | 2/1967 | Werner .............. 425/471 |
| 3,448,696 A | | 6/1969 | Verhoeven |
| 3,536,014 A | * | 10/1970 | Kuchuris et al. ........ 425/161 |
| 3,561,975 A | | 2/1971 | Luebering et al. |
| 3,650,764 A | | 3/1972 | Duquette |
| 3,821,452 A | * | 6/1974 | Hayashi .............. 426/502 |
| 3,851,075 A | | 11/1974 | Wisdom |
| D234,233 S | * | 2/1975 | Silvestri .............. D1/124 |
| 3,934,040 A | | 1/1976 | Smerak et al. |
| 3,936,255 A | * | 2/1976 | Bellacicco ........... 425/101 |
| 3,954,999 A | | 5/1976 | Vidal et al. |
| 3,956,517 A | * | 5/1976 | Curry et al. .......... 426/502 |
| 4,075,359 A | * | 2/1978 | Thulin ............... 426/502 |
| 4,276,800 A | | 7/1981 | Koppa et al. |
| 4,579,745 A | * | 4/1986 | Mei Sue ............. 426/512 |
| 4,586,888 A | | 5/1986 | Anderson |
| 4,606,923 A | * | 8/1986 | Ricke ................ 426/496 |
| 4,718,769 A | | 1/1988 | Conkey |
| 4,812,323 A | | 3/1989 | Savage |
| 4,865,862 A | | 9/1989 | McFeaters et al. |
| 4,881,889 A | | 11/1989 | Spiel et al. |
| D307,661 S | | 5/1990 | Tetzlaff |
| D309,210 S | | 7/1990 | Seyfert |
| 5,063,839 A | | 11/1991 | McFeaters et al. |
| 5,064,584 A | | 11/1991 | Jefferies |
| 5,162,119 A | | 11/1992 | Pappas et al. |
| 5,176,922 A | * | 1/1993 | Balsano et al. ......... 425/89 |
| 5,204,125 A | * | 4/1993 | Larsen .............. 425/298 |
| D338,318 S | * | 8/1993 | Jimenez et al. ........ D1/124 |
| 5,306,133 A | | 4/1994 | Dayley |
| 5,388,489 A | | 2/1995 | Dayley |
| 5,534,281 A | * | 7/1996 | Pappas et al. ......... 426/383 |
| 5,576,041 A | * | 11/1996 | Clow et al. ........... 426/439 |
| D376,466 S | * | 12/1996 | Ricke et al. .......... D1/124 |
| 5,641,527 A | * | 6/1997 | Burger .............. 426/94 |
| 5,683,734 A | | 11/1997 | Israel |
| D388,936 S | * | 1/1998 | Fosher .............. D1/128 |
| 5,789,009 A | * | 8/1998 | Kordic et al. ......... 426/391 |
| 5,861,185 A | | 1/1999 | Capodieci |
| 6,004,612 A | * | 12/1999 | Andreski et al. ....... 426/618 |
| 6,194,017 B1 | | 2/2001 | Woodward et al. |
| 6,210,728 B1 | | 4/2001 | Capodieci |
| 6,461,649 B1 | | 10/2002 | Ogisu et al. |
| 6,607,765 B2 | | 8/2003 | Capodieci |
| RE38,507 E | | 4/2004 | Olesen |
| 6,783,782 B1 | * | 8/2004 | Larsen et al. ......... 426/76 |
| 6,902,754 B1 | * | 6/2005 | Evans et al. .......... 426/503 |
| D510,651 S | * | 10/2005 | Ellis et al. ........... D1/128 |
| D513,821 S | * | 1/2006 | Kenig ............... D1/106 |
| D515,274 S | * | 2/2006 | Griebel et al. ........ D1/120 |
| D549,426 S | * | 8/2007 | Fu et al. ............. D1/122 |
| 7,252,491 B2 | * | 8/2007 | Errera ............... 425/96 |
| 7,331,776 B2 | * | 2/2008 | Errera ............... 425/298 |
| 2003/0203094 A1 | * | 10/2003 | Andersen et al. ....... 426/549 |
| 2005/0150394 A1 | * | 7/2005 | Errera ............... 99/388 |
| 2007/0275143 A1 | * | 11/2007 | Hoskins et al. ........ 426/496 |

* cited by examiner

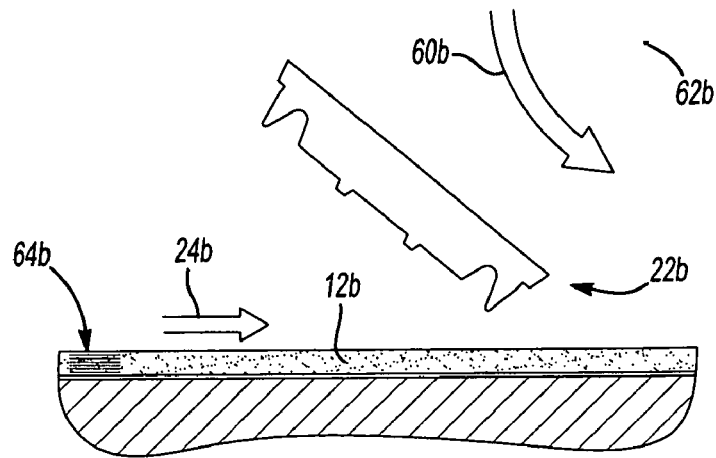
_Fig-5_
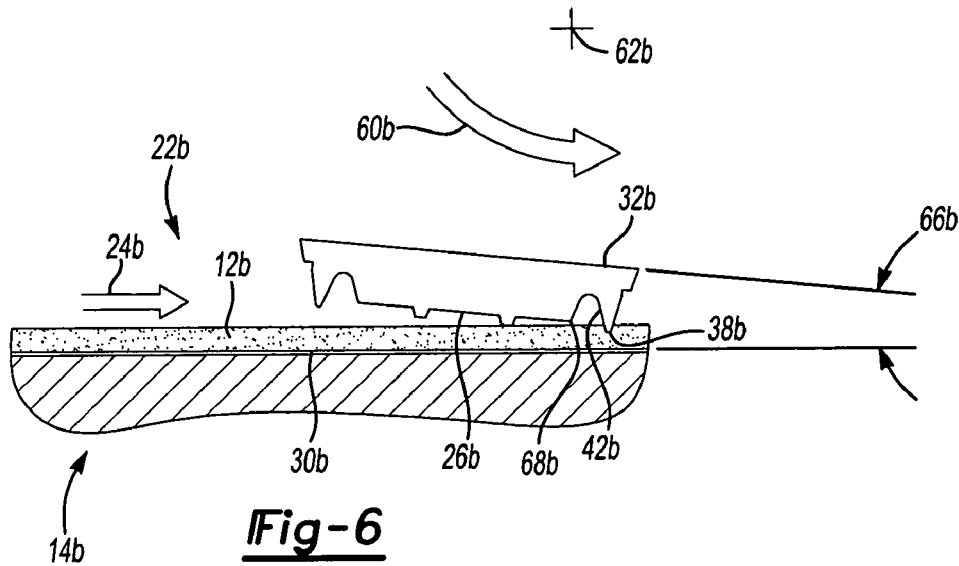
_Fig-6_
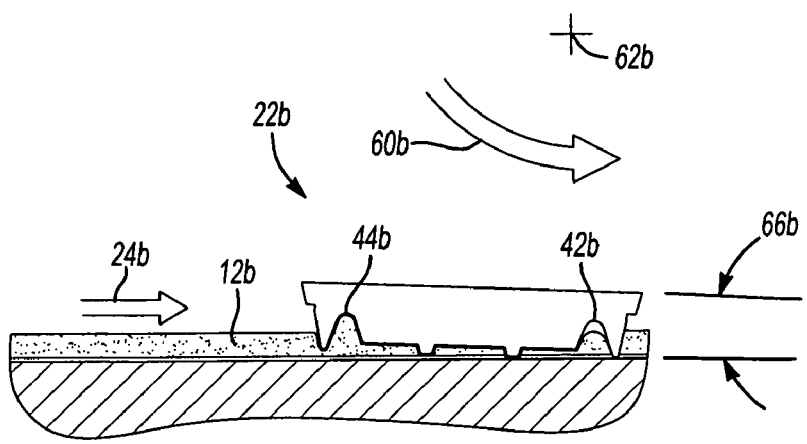
_Fig-7_

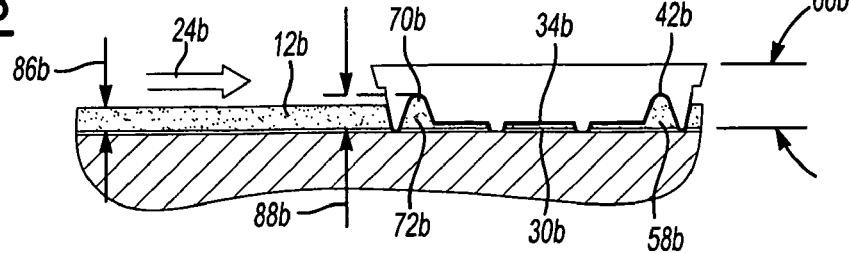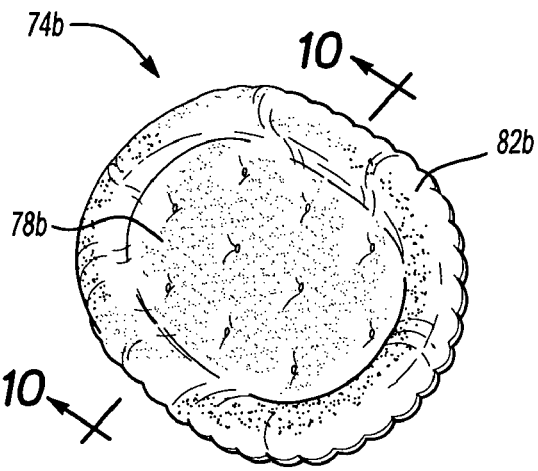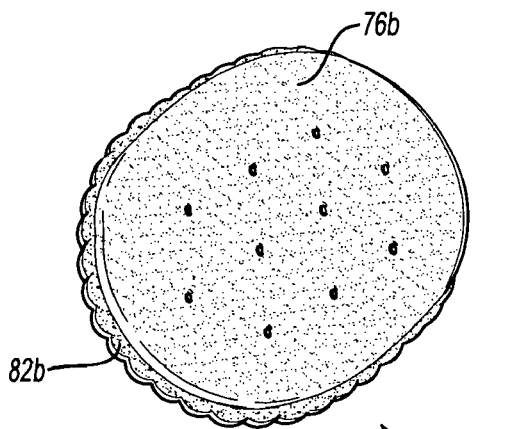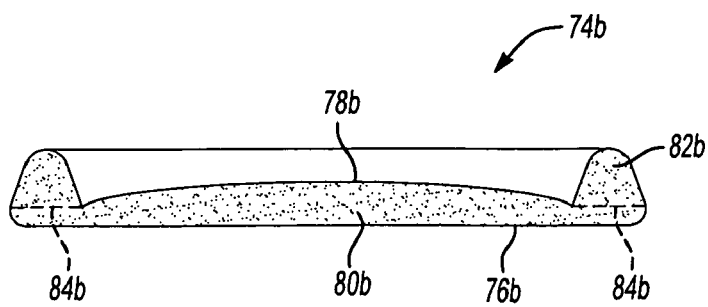

METHOD OF FORMING FOOD PRODUCT

CROSS-REFERENCE TO RELATED APPLICATIONS

This application claims the benefit of U.S. Provisional Patent Application Ser. No. 60/690,757 for a TUB OR CUP SHAPED CRACKER, filed on Jun. 15, 2005, which is hereby incorporated by reference in its entirety.

BACKGROUND OF THE INVENTION

1. Field of the Invention

The invention relates to a tub-shaped food product formed from a ribbon of dough with a cutting die, such as biscuits, crackers or cookies.

2. Description of the Related Art

U.S. Pat. No. 4,562,084 discloses extruding a plurality of parallel ribbons of cookie dough extrudate onto a first conveyor belt, cutting the ribbons in a staggered pattern to form individual cookie preforms, and feeding the preforms onto a second conveyor belt moving at a speed at least twice that of the first conveyor belt in order to separate successive preforms by at least the length of a cookie preform. U.S. Pat. No. 859,999 discloses a machine for making cookies. U.S. Pat. No. 2,813,033 discloses a method for packaging or preparing a group of formed pieces of edible doughy material ready for cooking.

SUMMARY OF THE INVENTION

The invention provides a method of forming an edible item. The method includes the step of forming dough into a substantially planar ribbon having a first height. The dough is at least partially elastic. The method also includes the step of permanently displacing a portion of the at least partially elastic ribbon to a second height greater than the first height with a cutting die. The inventive method can produce a cracker formed from sheetable dough. The inventive cracker includes a first portion of planar configuration and a second portion integrally formed with and raised from said first portion.

Other applications of the present invention will become apparent to those skilled in the art when the following description of the best mode contemplated for practicing the invention is read in conjunction with the accompanying drawings.

BRIEF DESCRIPTION OF THE DRAWINGS

FIG. 5 is a first process detail view wherein the cutting die according to the third exemplary embodiment of the invention is shown moving into engagement with a ribbon of dough;

FIG. 6 is a second process detail view occurring after the first process detail view of FIG. 5 wherein the cutting die is shown initially engaging the ribbon of dough;

FIG. 7 is a third process detail view occurring after the second process detail view of FIG. 6 wherein the cutting die is shown further engaging the ribbon of dough;

FIG. 8 is a fourth process detail view occurring after the third process detail view of FIG. 7 wherein the cutting die is shown fully engaging the ribbon of dough to form a substantially discrete piece of dough from the ribbon;

FIG. 9 is a top perspective view of a tub-shaped food product formed by the third exemplary cutting die;

FIG. 10 is a cross-sectional view of the tub-shaped food product taken along section lines 10-10 in FIG. 9;

FIG. 11 is a bottom perspective view of the tub-shaped food product shown in FIGS. 9 and 10;

DETAILED DESCRIPTION OF A PREFERRED EMBODIMENT

Figure 1:
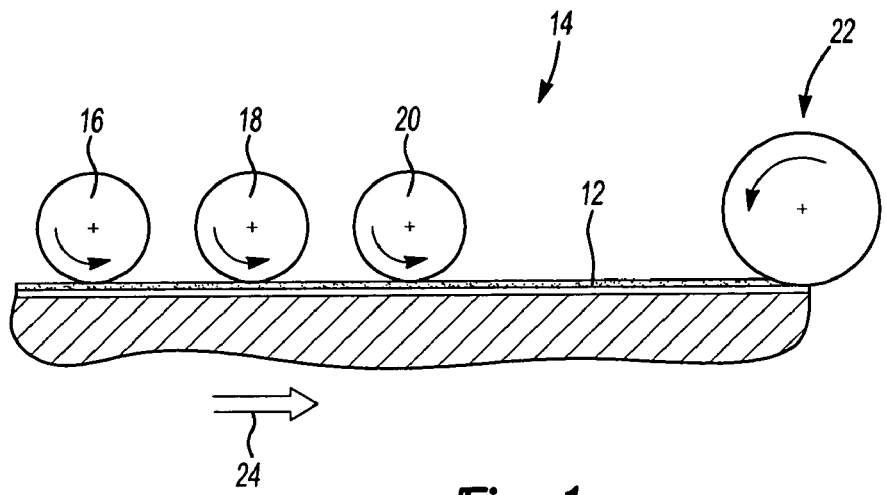
FIG. 1 is a schematic view of a first exemplary embodiment of the invention.

A plurality of different embodiments of the invention are shown in the Figures of the application. Similar features are shown in the various embodiments of the invention. Similar features have been numbered with a common reference numeral and have been differentiated by an alphabetic designation. Also, to enhance consistency, features in any particular drawing share the same alphabetic designation even if the feature is shown in less than all embodiments. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

The present invention can be practiced to produce a snack such as a cracker with raised edges. Dough is formulated to make the snack such that the dough can be formed into a ribbon. Thus, the dough is at least partially elastic, unlike cookie dough. The dough has an open cell structure and products formed from the dough will be lighter and less dense than products made from "non-ribbonable" dough such as cookie dough. However, the dough is also formulated to be permanently extendable without tearing to form of a discrete food piece with a raised portion. Exemplary types of dough are set forth and described in U.S. Pat. No. 6,267,998, which is hereby incorporated by reference in its entirety. In the exemplary embodiment of the invention set forth below, a cracker is formed with a portion of planar configuration and a portion raised from the planar configuration. A trough is defined by the raised portion and an upper surface of the planar portion. It can be desirable to dispose toppings such as dips and spreads in the trough.

The inventive method includes the step of forming dough into a ribbon. FIG. 1 shows a ribbon 12 of dough moving along a production line 14. A plurality of rollers 16, 18, 20 and a cutting die 22 are disposed along the production line 14. The ribbon 12 is formed from dough that is at least partially elastic and sufficiently strong to be formed as a ribbon, but also sufficiently flexible to be moved in the cutting die 22 as set forth below.

The dough can be any of a number of flavors, whatever flavor is desired. For example, the dough may include garlic flavor, whole grain flavor, buttery flavor, etc. The dough is formed in a mixer, such as a Peerless® mixer, where ingredients are added in several stages. In the exemplary embodiment of the invention, the following ingredients may be added to the mixer in a first stage: any vegetable oil such as a soy/cottonseed oil blend; sweeteners such as high fructose corn syrup, 62 DE corn syrup, and/or fine granulated sugar, granulated salt, sodium sulfite, enzyme, and water. Optionally, flavors can also be added such as malt extract, honey, and honey flavor. Flavors may also be added to the ribbon 12 or to the discrete dough piece that emerges from the cutting die 22.

The ingredients that are added in the first stage may be mixed in the mixer for approximately one to five minutes at low speed. In a second stage, the following ingredients may be added to the mixer: flour and corn starch or other starches. Other ingredients may include: sodium bicarbonate, acid leavening blend, non-dairy butter garlic flavor, parsley flakes, garlic powder, oat bran, wheat germ, etc. The levels of enzyme and sodium sulfite can be relatively higher than that of other crackers while the levels of soda and leavening acid can be lower than that of other crackers.

The flour may include soft red or white winter wheat varieties. Hard wheat can also be used depending on the desired texture. The flour can be fortified with niacin, iron in reduced form, thiamine in mononitrate form, riboflavin and folic acid. The enzyme can be a microbial, proteolytic enzyme derived from *Bacillus subtillis* also having significant amylase and protylase activity. The active enzymes will be on a base of food-grade cornstarch and dextrose. Use of the enzyme enables the dough to weaken its gluten structure to be molded as disclosed below. The enzyme could also come from plant or fungal sources.

In the exemplary embodiment of the invention, the mixer is mixed for three to nine minutes at low speed after the second stage of ingredients are added. For some varieties of cracker, a third stage may be carried out wherein the following ingredients are added to the mixer: ammonium bicarbonate and water. The water may be added at a temperature that is preferable 100-120 degrees F. The temperature of the mixer jacket is approximately 110 degrees F. The resultant dough temperature, following mixing is approximately 90-100 degrees F. However, other temperatures may also be used to achieve the desired dough consistency. An example of formulas and mixing instructions for "original", "garlic herb", and "honey wheat" dough are included at Table 1 below, where the formula of a "classic" cracker is also provided. A variety of doughs would work for this invention, such as whole grain dough, yeast leavened sponge dough, and sweet dough.

TABLE 1

| INGREDIENT | Original % | Garlic Herb % | Honey Wheat % | Classic Cracker % |
|---|---|---|---|---|
| Vegetable Oils (liquid and/or partially hydrogenated) | 9.11% | 8.96% | 8.17% | 8.83% |
| High Fructose Corn Syrup | 0.65% | 0.64% | 0.58% | 0.67% |
| 62 DE Corn Syrup | 1.10% | 1.09% | 0.99% | 1.08% |
| Water | 17.71% | 17.64% | 16.05% | 16.74% |
| Fine Granulated Sugar | 4.73% | 4.65% | 8.76% | 4.69% |
| Granulated Salt | 0.72% | 0.70% | 0.64% | 0.82% |
| Sodium Sulfite | 0.017% | 0.017% | 0.018% | 0.012% |
| Enzyme Tablet | 0.011% | 0.011% | 0.012% | 0.006% |
| Malt Extract | n/a | n/a | 0.64% | n/a |
| Honey | n/a | n/a | 1.63% | n/a |
| Honey Flavor | n/a | n/a | 0.58% | n/a |
| Water (as % of dry ingred) | 20-30% | 20-30% | 20-30% | 20-30% |
| Mix 1-5 mins at Low Speed | | | | |
| Enriched Flour Blend | 61.84% | 60.82% | 49.62% | 65.60% |
| Corn Starch | 3.31% | 3.26% | 5.84% | n/a |
| Oat Bran | n/a | n/a | 1.46% | n/a |
| Defatted Wheat Germ | n/a | n/a | 3.94% | n/a |
| Sodium Bicarbonate | 0.27% | 0.35% | 0.35% | 0.52% |
| Acid Leavening Blend | 0.53% | 0.70% | 0.70% | 1.03% |
| Non-Dairy Butter Garlic Flavor | n/a | 0.96% | n/a | n/a |
| Parsley Flakes | n/a | 0.19% | n/a | n/a |
| Garlic Powder | n/a | 0.02% | n/a | n/a |
| Mix 3-9 mins at Low Speed | | | | |
| | 100.00% | 100.00% | 100.00% | 100.00% |

Cheese dough can also be used with the invention. The table below provides an example for a cheese dough product:

TABLE 2

| INGREDIENT/STEP | % |
|---|---|
| Vegetable Oils (liquid and/or partially hydrogenated) | 40.81% |
| Enriched Wheat Flour | 4.68% |
| Yeast | 0.06% |
| Enzyme | 0.03% |
| Seed SPONGE | 0.11% |
| Water | 20-40% |
| Mix 1-5 mins at Low Speed | |
| Time to Ferment: 5-24 hr | |
| Enriched Wheat Flour | 27.21% |
| Hard Wheat Flour | 13.60% |
| Cheese | 12.15% |
| Fine Dough Salt | 0.67% |
| Ground Paprika | 0.67% |
| Water | 3-10% |
| Mix 3-15 mins at Low Speed | |
| | 100.00% |

Following mixing of the dough in the mixer, the dough is allowed to rest for approximately 30-45 minutes. The time the dough is allowed to rest is called the "lay time." Usually, the dough is removed from the mixer and placed into a trough to rest during the lay time. At the end of the lay time, the dough is dumped into a hopper. A dough-hopper is positioned above a primary roller pair. The dough hopper feeds the dough between the primary roller pair to form a relatively thick sheet onto a first conveyor arrangement. The relatively thick dough sheet is reduced to a relatively thin dough sheet as it fed through a pair of spiral rollers along the first conveyor arrangement. The relatively thin sheet is then laminated about four times to form a layered dough ribbon across a second conveyor arrangement. Although not shown, the first and second conveyor arrangements can be part of the production line 14.

The ribbon 12 of layered dough can be moved in a first direction 24. A series of reduction roller pairs are arranged along a second conveyor arrangement of the production line 14. The rollers 16, 18, and 20 schematically represent the roller pairs. The ribbon 12 of layered dough is fed to between the reduction roller pairs 16, 18, 20 and reduced to a first thickness or height 86 (shown in FIG. 5). The first thickness is approximately three mm (0.1181 inch) in the exemplary embodiment of the invention. If necessary, further reductions can be used. The ribbon 12 may not be perfectly flat, but is substantially planar.

The third thickness of dough is the thickness prior to forming a discrete piece of dough with the cutting die 22. The ribbon 12 of dough at the third thickness moves along production line 14 to the cutting die 22. The ribbon 12 is moving along the production line 14 at 10-100 ft/min in the first direction 24 in the exemplary embodiment of the invention.

Figure 2:
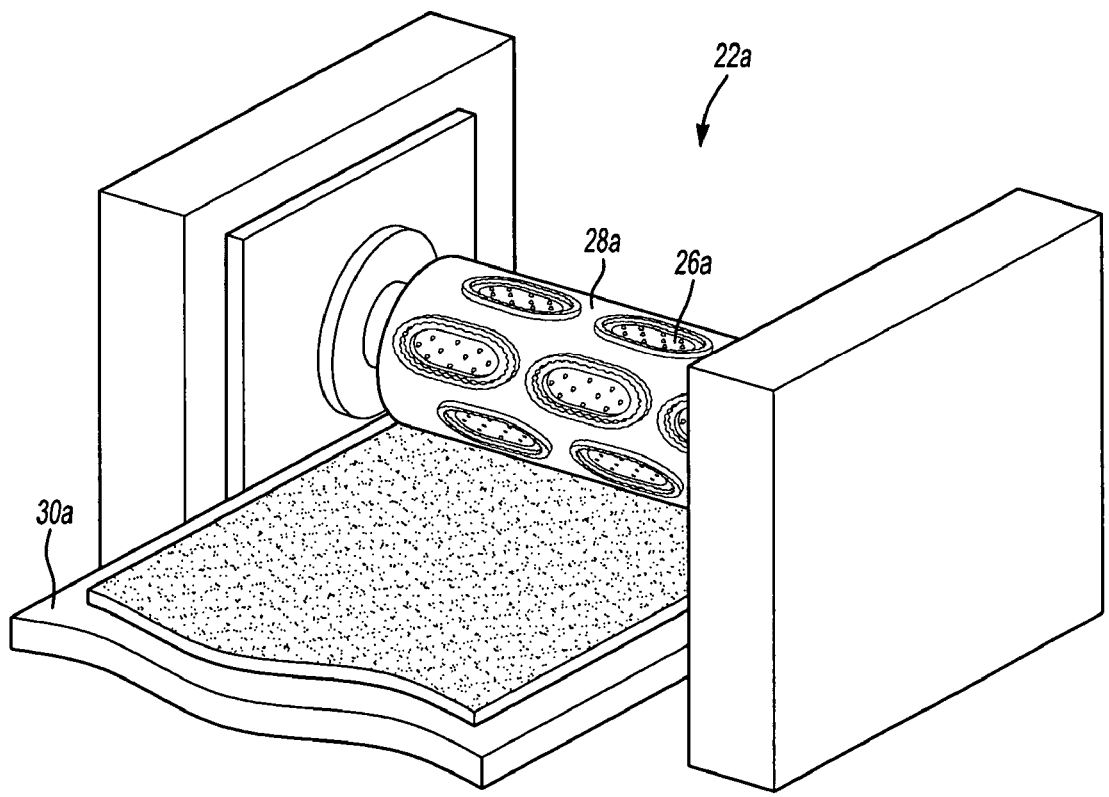
FIG. 2 is a perspective view of a cutting die according to a second exemplary embodiment of the invention.

The method also includes the step of passing the ribbon 12 by the cutting die 22. In the exemplary embodiment of the invention, the ribbon 12 passes under the cutting die 22. FIG. 2 shows an exemplary cutting die 22*a*. The cutting die 22*a* is substantially cylindrical and includes at least one cavity defined by a surface 26*a*. The exemplary cutting die 22*a* includes a plurality of surfaces similar to surface 26*a*, each surface defining a cavity. The surface 26*a* corresponds to the desired shape of a discrete piece of dough. The surface 26*a* also corresponds to the desired shape of a discrete food product formed by further processing the discrete piece of dough, such as by baking. In alternative embodiments of the invention, one or more of the surfaces on the cutting die could be different from one another, resulting in the formation of differently shaped food products from a single cutting die.

Figure 3:
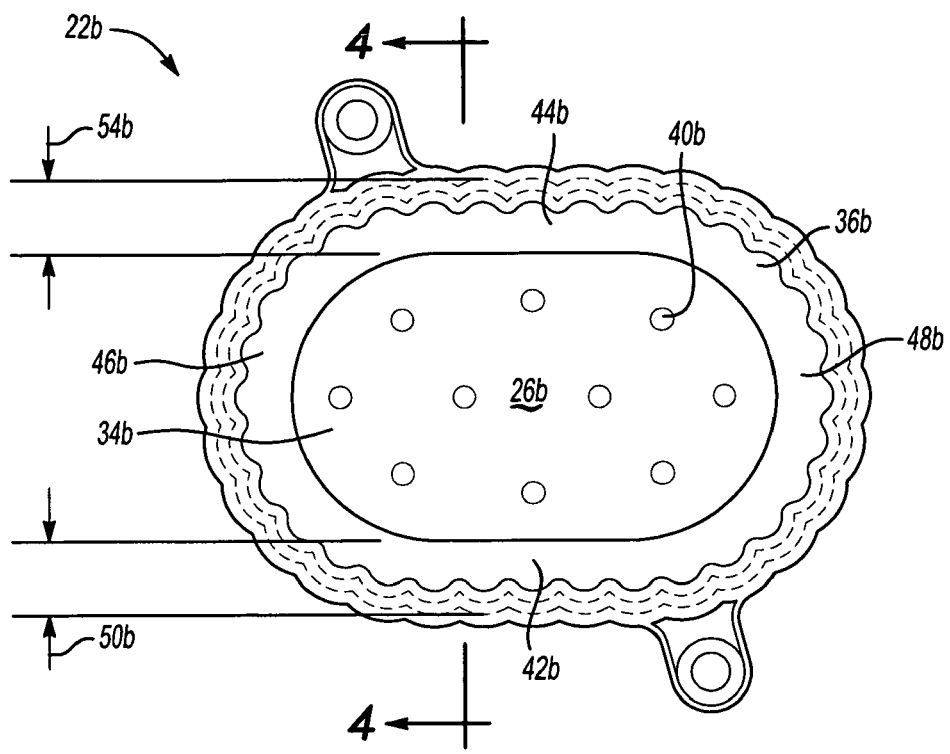
FIG. 3 is a top view of a cutting die according to a third exemplary embodiment of the invention.
Figure 4:
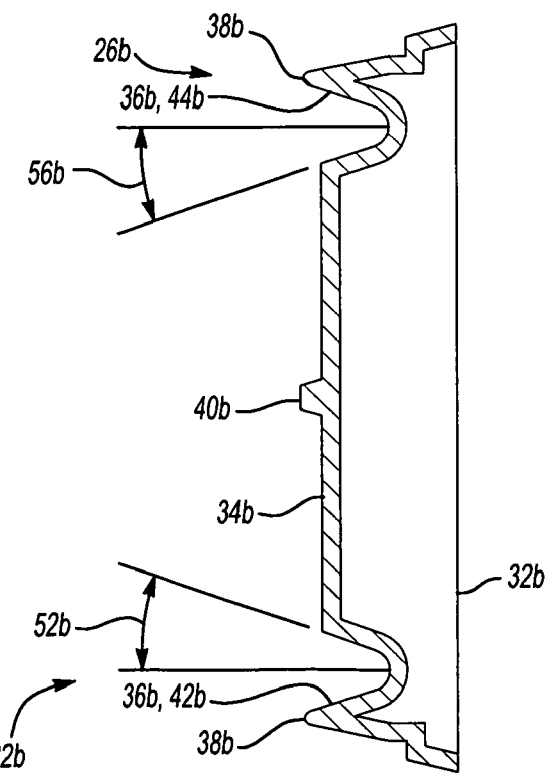
FIG. 4 is a cross-sectional view of the cutting die according to the third exemplary embodiment of the invention taken along section lines 4-4 in FIG. 3.

In the exemplary cutting die 22*a*, the surface 26*a* is integrally formed with respect to a substantially cylindrical body portion 28*a*. The body portion 28*a* is rotated about its centered, longitudinal axis as the ribbon 12 is passed between the cutting die 22*a* and a surface 30*a* of a conveyor of the production line 14. FIGS. 3 and 4 show an alternative cutting die 22*b* that can be releasably connected to another structure. For example, the cutting die 22*b* can be bolted to a generally cylindrical body to be rotated about an axis. The generally cylindrical body may not be perfectly cylindrical to accommodate a planar back surface 32*b* of the cutting die 22*b*. A plurality of cutting dies similarly shaped to cutting die 22*b* could be bolted to a generally cylindrical body to be rotated about an axis. Alternatively, a plurality of differently shaped cutting dies could be bolted to a generally cylindrical body to be rotated about an axis to form differently shaped discrete pieces of dough.

Figure 12:
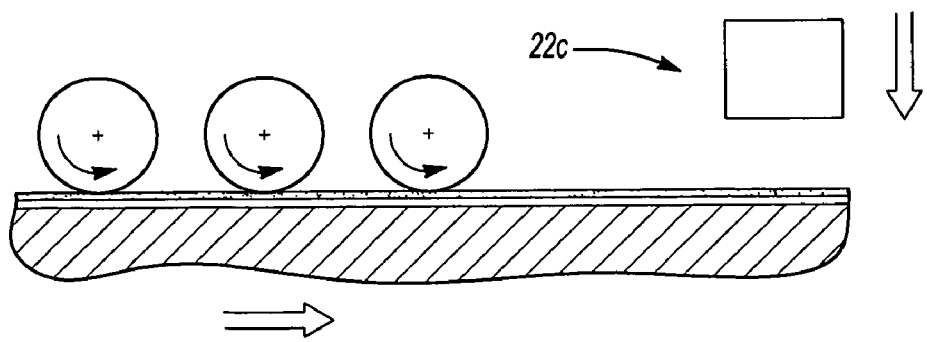
FIG. 12 is a schematic view of a fourth exemplary embodiment of the invention.

The cutting die 22*b* moves in the first direction 24 with the ribbon 12. As set forth in the exemplary embodiment of the invention, the cutting die 22*b* is a rotating cutting die. When the cutting die 22*b* is engaging the ribbon 12, the cutting die 22*b* includes a first component of motion that is in the first direction and a second component of motion that is perpendicular to the first direction. Motion patterns of the cutting die other than rotation can be practiced with the invention. FIG. 12 shows a reciprocating die 22*c*.

Referring again to FIGS. 3-8, the surface 26*b* of the cutting die 22*b* includes a plateau portion 34*b* and a trench portion 36*b* surrounding the plateau portion 34*b*. An outer edge 38*b* of the trench portion 36*b* projects past the plateau portion 34*b*. In other words, outer edge 38*b* of the trench portion 36*b* is further from the back surface 32*b* than the plateau portion 34*b*. One or more docker pins 40*b* can extend from the plateau portion 34*b*. The docker pins 40*b* enhance consistent cooking of the food product.

The trench portion 36*b* includes a leading trench portion 42*b*, a trailing trench portion 44*b*, and two side trench portions 46*b*, 48*b* connect the leading and trailing trench portions 42*b*, 44*b*. The leading trench portion 42*b* defines a width 50*b* and an opening slope 52*b*. The trailing trench portion 44*b* defines a width 54*b* and an opening slope 56*b*. The width 50*b* is greater than the width 54*b*. In the exemplary embodiment of the invention, the width 50*b* is approximately eighteen percent greater than the width 54*b*. The opening slope 52*b* is greater than the opening slope 56*b*. In the exemplary embodiment of the invention, the opening slope 52*b* is thirty-three percent greater than the opening slope 56*b*. Thus, a larger volume is defined with a leading half of the cavity 26*b* than a trailing half of the cavity 26*b*. The differences in the widths 50*b*, 54*b* and opening slopes 52*b*, 56*b* between the leading and trailing trench portions 42*b*, 44*b*, respectively, are joined by a gentle blend defined in the side trench portions 46*b*, 48*b*.

FIGS. 5-8 show a sequence of detail process views in which a discrete piece of dough 58*b* is formed from a ribbon 12*b* passes the cutting die 22*b*. In FIG. 5, the cutting die 22*b* is being rotated in a direction 60*b* about an axis 62*b*. The direction 60*b* is rotational and includes a first component of motion in the first direction 24*b*. The ribbon 12*b* is formed with a plurality of layers 64*b*. As set forth above, the thickness of the ribbon 12*b* in the exemplary embodiment of the invention is about three mm (0.1181 inch).

In FIG. 6, both the cutting die 22*b* and the ribbon 12*b* have continued to move in the first direction 24*b* from the view shown in FIG. 5. A leading portion of the outer edge 38*b* pierces the ribbon 12*b*. The back surface 32*b* of the cutting die 22*b* and the surface 30*b* of the production line 14*b* form an angle 66*b* with respect to one another. Also, an edge 68*b* defined between the plateau portion 26*b* and the leading trench portion 42*b* contacts the ribbon 12*b*.

In FIG. 7, both the cutting die 22*b* and the ribbon 12*b* have continued to move in the first direction 24*b* from the view shown in FIG. 6. The angle 66*b* between the back surface 32*b* of the cutting die 22*b* and the surface 30*b* of the production line 14*b* still exists, although the value of the angle 66*b* has decreased from the value corresponding to FIG. 6. Dough from the ribbon 12*b* has been compressed and moved with the cutting die 22*b* to fill the trailing trench portion 44*b*. However, the leading trench portion 42*b* is not yet filled.

In FIG. 8, both the cutting die 22*b* and the ribbon 12*b* have continued to move in the first direction 24*b* from the view shown in FIG. 7. The back surface 32*b* of the cutting die 22*b* and the surface 30*b* of the production line 14*b* are now parallel with one another. The discrete piece 58*b* of dough has been substantially separated from the ribbon 12*b*, although some webbing may exist. The thickness of the discrete piece 58*b* between the plateau portion 34*b* and the surface 30*b* is approximately 0.036 inch. As a result, the ribbon 12*b* has been compressed approximately 69.5%. In alternative embodiments of the invention, the compression rate could be 60%-80%. The invention can be practiced wherein the compression rate is between 10%-80%.

The method also includes the step of displacing dough in the first direction to fill the cavity in the cutting die during the passing step. FIG. 8 also shows that dough from the ribbon 12b, including at least portions of the multiple layers 64b, has been displaced in the first direction to fill the leading portion 42b of the trench 36b. Dough has been moved forward, in the first direction, during the process between the views shown in FIGS. 7 and 8. It is believed that approximately 61.4% of the dough of the discrete piece 58b is displaced to fill the trench portion 36b during the exemplary process.

As used herein, the amount of dough displaced refers to the amount of dough moved from a planar configuration to an raised configuration. The ribbon 12b defines a planar configuration before passing the cutting die 22b. The discrete piece of dough 58b includes a portion that is of planar configuration and a portion that is of raised configuration extending from the portion of planar configuration; a raised portion 70b in the exemplary embodiment of the invention fills the trench portion 36b of the surface/cavity 26b. The planar portion 72b of the discrete piece 58b extends between the surface 30b and a plane including, but not limited to, the plateau surface 26b. In alternative embodiments of the invention, 50%-70% may be displaced. It is believed that the invention can be practiced wherein 10%-80% of the dough is displaced.

The process illustrated in FIGS. 5-8 and described above results in a portion of the ribbon 12, the raised portion 70b, being permanently displaced to a second height 88b greater than the first height 86b. The second height 88b of the dough increases 39.4% from the first height in the exemplary embodiment of the invention. As set forth above, the thickness of the ribbon 12b is approximately 0.1181 inch prior to passing the cutting die 22b. The height of the raised portion 70b in combination with the height of the planar portion 72b is approximately 0.195 inch in the exemplary embodiment of the invention. Thus, the maximum height of the dough increases 39.4%. In alternative embodiments of the invention, it is believed that the maximum height of the dough can be increased 20%-60%.

After the discrete piece 58b of dough has been formed by the cooperation between the cutting die 22b and the moving ribbon 12b, the discrete piece 58b of dough can be further processed to form a food product. The discrete piece 58b can be baked to form an exemplary food product 74b, as shown in FIGS. 9-11. The food product 74b includes a bottom surface 76b, a top surface 78b, a planar portion 80b defined between the bottom surface 76b and the top surface 78b, and an raised portion 82b integrally formed with the planar portion 80b. The top surface 78b and the raised portion 82b cooperate to tub or trough. The table below provides exemplary dimensions of the food 74b:

TABLE 3

| | Weight (gm) | | | | Height (mm) | | | |
|---|---|---|---|---|---|---|---|---|
| Sample | Total | Planar Portion | Raised Portion | Raised (%) | Total | Planar Portion | Raised Portion | Raised (%) |
| 1 | 43.7 | 29.2 | 14.5 | 33.2% | | | | |
| 2 | 44.6 | 29.8 | 14.8 | 33.2% | | | | |
| 3 | 44.3 | 30.4 | 13.9 | 31.4% | | | | |
| 4 | 44.3 | 29 | 15.3 | 34.5% | 67.5 | 47 | 20.5 | 30.4% |
| 5 | 44.4 | 29.3 | 15.1 | 34.0% | 67 | 48 | 19 | 28.4% |
| 6 | 43.8 | 28.7 | 15.1 | 34.5% | 67 | 46 | 21 | 31.3% |
| 7 | 43.4 | 31.3 | 12.1 | 27.9% | 64 | 49 | 15 | 23.4% |
| 8 | 43 | 30 | 13 | 30.2% | 64 | 48 | 16 | 25.0% |
| 9 | 43.5 | 29.7 | 13.8 | 31.7% | 64 | 48 | 16 | 25.0% |
| 10 | 39.7 | 27.1 | 12.6 | 31.7% | | | | |
| 11 | 40 | 26.6 | 13.4 | 33.5% | | | | |
| 12 | 40.1 | 27.3 | 12.8 | 31.9% | | | | |
| 13 | 39.6 | 25.3 | 14.3 | 36.1% | 68 | 45.5 | 22.5 | 33.1% |
| 14 | 39.7 | 26.8 | 12.9 | 32.5% | 67 | 46 | 21 | 31.3% |
| 15 | 43.4 | 30.5 | 12.9 | 29.7% | 66 | 51 | 15 | 22.7% |
| 16 | 43.4 | 30.6 | 12.8 | 29.5% | 66 | 52 | 14 | 21.2% |
| 17 | 43.8 | 31.2 | 12.6 | 28.8% | 66.5 | 51 | 15.5 | 23.3% |

Each sample of Table 2 includes ten individual pieces of the food product 74b. Thus, each value in the total weight column is the weight of ten crackers. Each value in the total height column is the height of ten crackers stacked on top of one another. With reference to FIG. 10, the planar portion 80b and the raised portion 82b are distinguished from one another at the line 84b. The table shows that The second or raised portion 82b of the food product 74b can be between 25% and 40% of the cracker by weight. The second or raised portion 82b of the food product 74b can be between 20% and 40% of a height of the cracker.

Figure 13:
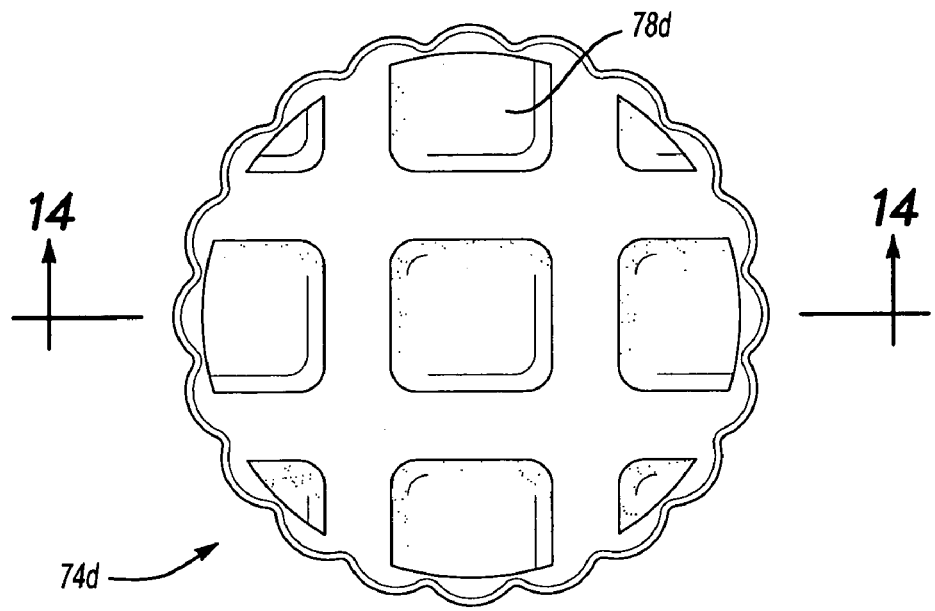
FIG. 13 is a top view of a food product formed by another embodiment wherein the raised portion is forms a grid pattern.
Figure 14:
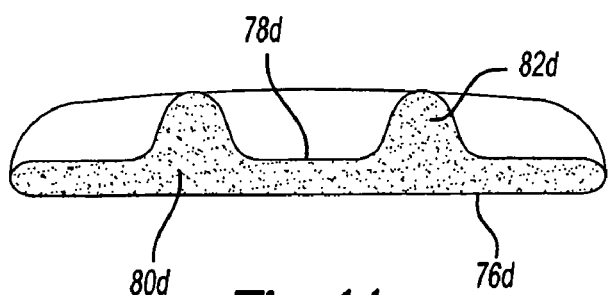
FIG. 14 is a cross-sectional view taken along section lines 14-14 in FIG. 13.

FIGS. 13 and 14 show an alternative food product 74d formed according to an alternative embodiment of the invention. The food product 74d includes a raised portion 82d shaped like a grid. The raised portion 82d extends from a planar portion 80d having a top surface 78d.

The foregoing invention has been described in accordance with the relevant legal standards, thus the description is exemplary rather than limiting in nature. Variations and modifications to the disclosed embodiment may become apparent to those skilled in the art and do come within the scope of the invention. For example, food products shaped differently than tub-shaped food products can be produced according to the invention. Food products produced according to the invention can include raised portions that are shaped like letters, text, symbols, grid patterns, or any other desired shape. Accordingly, the scope of legal protection afforded this invention can only be determined by studying the following claims.

What is claimed is:
1. A method of forming an edible item comprising the steps of:
   forming a unitary cutting die;
   forming dough being at least partially elastic into a substantially planar ribbon having a first height;
   permanently displacing a portion of the at least partially elastic ribbon to a second height greater than the first height with the unitary cutting die; and cutting a discrete piece of dough from the at least partially elastic ribbon with the unitary cutting die to form the edible item;

wherein the permanently displacing step and the cutting step are preformed simultaneously to one another with the unitary cutting die having a surface defining a cavity for displacing the portion of the at least partially elastic ribbon and an outer edge formed integrally with the surface for cutting the discrete piece of dough and defining the cavity with the cutting die having a leading trench defining the cavity with the cutting die having a leading trench portion with a first width and a first opening slope to a define a first volume and trench portion with a second width and a second opening slope to define a second volume wherein the first volume of the leading trench portion is larger than the second volume of the trailing trench portion.

2. The method of claim 1 wherein said permanently displacing step further comprises the steps of:

permanently elevating a first portion of the dough from the first height to the second height; and permanently compressing a second portion of the dough from the first height to a third height less than the first height.

3. The method of claim 1 wherein said permanently displacing step further comprises the step of:

forming the displaced portion as a ring surrounding and integrally formed with a substantially flat surface to define a trough.

4. The method of claim 1 wherein said permanently displacing step further comprises the step of:

forming the displaced portion as a grid projecting from and integrally formed with a substantially flat surface.

5. The method of claim 1 further comprising the steps of:

moving the at least partially elastic ribbon of dough in a first direction;

moving the cutting die in the first direction during said permanently displacing step.

6. The method of claim 5 further comprising the step of:

displacing a portion of the at least partially elastic ribbon in the first direction to fill a cavity in the cutting die during said permanently displacing step.

7. The method of claim 5 wherein said moving step is further defined as:

moving the at least partially elastic ribbon of dough in the first direction at a speed of between ten and one hundred feet per minute.

8. The method of claim 5 wherein said step of moving the cutting die is further defined as:

rotating the cutting die such that movement of the cutting die includes a first component in the first direction with the ribbon and includes a second component of motion perpendicular to the first direction and to the ribbon.

9. The method of claim 5 wherein said step of moving the cutting die is further defined as:

reciprocating the die between an elevated position spaced from the at least partially elastic ribbon and a lowered position engaging the at least partially elastic ribbon.

10. The method of claim 1 wherein said forming step includes the step of:

laminating the dough to form the at least partially elastic ribbon with multiple layers, wherein at least portions of the multiple layers are displaced during said permanently displacing step.

11. The method of claim 1 wherein said permanently displacing step includes the step of:

filling the trailing trench portion of the cavity before the leading trench portion.

12. A method of forming an edible item comprising the steps of:

forming a unitary cutting die:

forming dough being at least partially elastic into a substantially planar ribbon having a first height;

cutting a discrete piece of dough from the at least partially elastic ribbon with the unitary cutting die;

permanently displacing a portion of the at least partially elastic ribbon to a second height greater than the first height with the unitary cutting die; and baking the cut, discrete piece of dough having the permanently displaced portion to form a snack with an raised portion;

wherein the permanently displacing step and the cutting step are preformed simultaneously to one another with the unitary cutting die having a surface defining a cavity for displacing the portion of the at least partially elastic ribbon and an outer edge formed integrally with the surface for cutting the discrete piece of dough and defining the cavity with the cutting die having a leading trench defining the cavity with the cutting die having a leading trench portion with a first width and a first opening slope to a define a first volume and trench portion with a second width and a second opening slope to define a second volume wherein the first volume of the leading trench portion is larger than the second volume of the trailing trench portion.

* * * * *

UNITED STATES PATENT AND TRADEMARK OFFICE
CERTIFICATE OF CORRECTION

| | | |
|---|---|---|
| PATENT NO. | : 7,914,834 B2 | Page 1 of 1 |
| APPLICATION NO. | : 11/453510 | |
| DATED | : March 29, 2011 | |
| INVENTOR(S) | : Bin Fu, Don Barnes and Suzanne Annette Devyak | |

It is certified that error appears in the above-identified patent and that said Letters Patent is hereby corrected as shown below:

Figure 5: The lead line for reference numeral "62b" should be touching a "+" symbol similar to Figures 6 & 7.

Figure 8: The lead line for reference numeral "62b" should be touching a "+" symbol similar to Figures 6 & 7.

Column 9, Line 9, Claim 1: "dough" should read -- dough, --.

Column 10, Line 22, Claim 12: "die:" should read -- die, --.

Column 10, Line 38, Claim 12: "dough" should read -- dough, --.

Signed and Sealed this
Twenty-first Day of August, 2012

David J. Kappos
*Director of the United States Patent and Trademark Office*